United States Patent
Haider et al.

(10) Patent No.: US 9,784,475 B2
(45) Date of Patent: Oct. 10, 2017

(54) HEAT STORAGE SYSTEM WITH UNDERFLOW AND OVERFLOW WEIRS

(75) Inventors: Markus Haider, Vienna (AT); Roland Eisl, Vienna (AT); Franz Holzleithner, Vienna (AT)

(73) Assignee: Technische Universität Wien, Vienna (AT)

( * ) Notice: Subject to any disclaimer, the term of this patent is extended or adjusted under 35 U.S.C. 154(b) by 988 days.

(21) Appl. No.: 13/820,602

(22) PCT Filed: Sep. 5, 2011

(86) PCT No.: PCT/AT2011/000362
§ 371 (c)(1),
(2), (4) Date: May 10, 2013

(87) PCT Pub. No.: WO2012/027769
PCT Pub. Date: Mar. 8, 2012

(65) Prior Publication Data
US 2013/0220306 A1    Aug. 29, 2013

(30) Foreign Application Priority Data

Sep. 3, 2010   (AT) ................................ A 1477/2010

(51) Int. Cl.
*F28D 19/02*    (2006.01)
*F24J 2/34*     (2006.01)
(Continued)

(52) U.S. Cl.
CPC    *F24J 2/34* (2013.01); *F28C 3/16* (2013.01); *F28D 13/00* (2013.01); *F28D 17/005* (2013.01);
(Continued)

(58) Field of Classification Search
CPC ......... F28D 2020/0004; F28D 20/0056; F28D 2020/006; F28D 2020/0065;
(Continued)

(56) References Cited

U.S. PATENT DOCUMENTS 3,745,668 A * 7/1973 Vian-Ortuno ............. B01J 8/36
34/589
4,873,828 A * 10/1989 Laing ...................... F03D 9/001
114/256
(Continued)

FOREIGN PATENT DOCUMENTS

| DE | 1015775 B | * | 9/1957 | ............ B01J 8/1836 |
| DE | 10149806 A1 | * | 4/2003 | ................ F24J 2/07 |
| FR | 1150954 A | * | 1/1958 | ................ F28C 3/14 |

*Primary Examiner* — Grant Moubry
*Assistant Examiner* — Harry Arant
(74) *Attorney, Agent, or Firm* — Panitch Schwarze Belisario & Nadel LLP (57) ABSTRACT

A heat storage system using sand as a solid heat storage medium has a fluidized bed heat exchanger (3) arranged between and separated from a storage tank (1) for cold sand and a storage tank (2) for hot sand by weirs (4, 5). The heat exchanger (3) is divided into a plurality of chambers (7) by weirs (6). The weirs (4, 5, 6) are arranged as a combination of overflow and underflow weirs. Fluidized sand is produced in the chambers (7) by a blower (14) positioned underneath the heat exchanger (3). Heat is transferred from a heat source to the sand fluidized and from the fluidized sand to a heat transport medium by transferring mechanisms (8, 9) in the chambers (7). The sand is redirected in a horizontal direction by horizontally acting blowers and/or installations (12) projecting into a respective chamber from a side.

12 Claims, 11 Drawing Sheets (51) Int. Cl.
*F28C 3/16* (2006.01)
*F28D 13/00* (2006.01)
*F28D 20/00* (2006.01)
*F28D 17/00* (2006.01)
*F28D 19/00* (2006.01)

(52) U.S. Cl.
CPC ............ *F28D 19/00* (2013.01); *F28D 19/02* (2013.01); *F28D 20/0056* (2013.01); *Y02E 60/142* (2013.01)

(58) Field of Classification Search
CPC ....... F28D 2020/0073; F28D 2020/082; F28D 2020/0095; F28D 19/02; F28D 20/00; F28D 20/021; F28D 20/025; F28D 2020/0008; F28D 17/005; F28C 3/16; F24J 2/28; F24J 2/34; B01J 8/36; C10J 3/12
USPC .... 165/10; 34/576, 369, 359, 360, 578, 588; 126/617, 620; 60/641.8; 422/139, 141, 422/142, 144, 145, 146
See application file for complete search history.

(56) References Cited

U.S. PATENT DOCUMENTS

| | | | |
|---|---|---|---|
| 7,350,318 B2* | 4/2008 | Dachauer | B01D 9/0031 34/576 |
| 2008/0016866 A1* | 1/2008 | Mohr | F28D 20/0056 60/649 |
| 2008/0153048 A1* | 6/2008 | Murakami | F23C 10/10 432/17 |

* cited by examiner

HEAT STORAGE SYSTEM WITH UNDERFLOW AND OVERFLOW WEIRS

CROSS-REFERENCE TO RELATED APPLICATION

This application is a Section 371 of International Application No. PCT/AT2011/000362, filed Sep. 5, 2011, which was published in the German language on Mar. 8, 2012, under International Publication No. WO 2012/027769 A2, and the disclosure of which is incorporated herein by reference.

STATE OF THE ART

The use of sand as a heat carrier or storage medium is generally known. For example, U.S. Pat. No. 4,338,919 A discloses a solar collector system, wherein a particulate energy collecting medium such as sand flows through a solar collector and thereby absorbs thermal energy. In a fluidized bed heat exchanger, this energy is transferred to a gaseous (e.g. air) or liquid medium (e.g. water), whereafter the solid is again passed through the solar collector.

In contrast to this, DE 101 49 806 C2 formally envisages an additional heat transfer medium between the solar collector and the sand, as well as a sand storage system. Specifically, this document provides a solar power tower in which a mirror heliostat field focusses sunlight to a radiation receiver, thereby heating it. Air flows through the radiation receiver positioned at the spire of the tower, which air absorbs heat and then contacts sand flowing through in counterflow direction within a heat exchanger positioned underneath and thus transfer the heat to the sand. This sand having a temperature of, for example, 800° C. is stored in a hot storage for releasing the heat as needed. For this purpose, the sand is passed through a fluidized bed cooler, where it releases the heat to a liquid or gaseous medium carried in heat exchange coils. Subsequently, the sand having a temperature of, for example, 150° C. is carried to a cold storage positioned outside of the tower from where it may be again delivered up the tower as needed.

The main disadvantage of this embodiment is that large amounts of sand have to travel considerable distances between the heat absorption and heat release locations or between the two sand storages. Transport is achieved by means of sand ducts containing, for example, a pneumatic conveying system, which consumes a major portion of the produced energy immediately on the spot and thus sometimes strongly reduces the efficiency of a solar power plant.

In addition, the presence of sand often poses several problems for solar power plants, in particular for parabolic troughs. Firstly, sand may lead to corrosion and abrasion of various components, secondly contaminate the mirrors, and thirdly cause blockages in mechanical connections, e.g. for adjusting the mirrors or for transporting the sand itself (see, for example, US 2008/0127967 A1, DE 101 60 577 A1, and US 2010/0058703 A1, which comment on these problems).

It was thus the object of the invention to provide an improved sand heat storage system that can be operated with little energy consumption and does not cause any problems with regard to corrosion or contamination by sand.

DISCLOSURE OF THE INVENTION

The invention achieves this object in a first aspect by providing a heat storage system using sand as a solid heat storage medium, characterized in that the system comprises the following components:

- a storage tank for cold sand;
- a storage tank for hot sand;
- a fluidized bed heat exchanger arranged therebetween, which is separated from the storage tanks by weirs and divided into a plurality of chambers by weirs,
  - wherein the weirs are arranged as a combination of overflow and underflow weirs;
  - wherein in the chambers of the heat exchanger, means for transferring heat from a heat source to the sand fluidized therein as well as means for transferring heat from the sand fluidized therein to a heat transport medium are provided; and
- at least one blower positioned underneath the heat exchanger for fluidizing the sand.

By means of such an inventive heat storage system, it is possible to move sand in a simple and power-saving fashion between the two storage tanks, which are positioned very close to each other, i.e. they are only separated by the fluidized bed heat exchanger positioned therebetween. The sand travels only minor distances and may be transported within the heat exchanger exclusively by means of a fluidizing medium so that no mechanical components are necessary in the heat exchanger. The mass streams of sand from the storage tanks, however, are preferably controlled by means of regulated mechanical conveying and/or hoisting devices therein, even though fluidizing the storage tank would also be possible according to the present invention, but would be uneconomical. The combination of overflow and underflow weirs guarantees that the solid mass stream created by the mechanical conveying and/or hoisting devices is carried efficiently through the fluidized bed heat exchanger. By providing several chambers in the fluidized bed heat exchanger, targeted heat exchange between the sand and the heat transfer means in the individual chambers may be achieved, which may provide for an increased degree of efficiency of the heat exchange.

Furthermore, the space required for such a heat storage system can be considerably reduced compared to the state of the art, because the transport of sand from one storage tank to the other and back does not require separate ducts, but transport takes place through the fluidized bed heat exchanger in both cases, wherein in addition thermal energy can be gained from the sand in both directions. Moreover, no separate ducts for conveying a hot fluid serving as a heat source and a cold fluid serving as a heat transport medium through the fluidized bed heat exchanger are required, because preferred embodiments allow for switching between different fluids that may be carried through the same ducts.

Furthermore, an inventive heat storage system may be provided as a closed system to prevent problems regarding corrosion, abrasion or contamination of facilities such as solar power or industrial plants, which can be combined with the heat storage system of the invention.

The type of plants is not particularly limited but includes any plant where large amounts of heat are generated and have to be stored until use (e.g. for producing electricity). These include, for example, power plants, e.g. power plants for producing alternative energy, industrial plants producing large amounts of waste heat (e.g. in exhaust gases), or storage plants for electric energy where energy is lost in the form of waste heat that can, at least in part, be recovered and stored by means of the inventive heat storage system. Of course, the present invention is especially suitable for solar power plants because the problems arising there in connection with sand, which were described above, can be solved practically completely and a more flexible supply of energy is allowed (for example, by generating electric energy also during the night). In a second aspect, the invention thus relates to the use of an inventive heat storage system for storing heat generated in such plants.

In preferred embodiments of the heat storage system according to the first aspect of the invention, the weirs between the individual chambers of the fluidized bed heat exchanger and between the heat exchanger and the two storage tanks are vertically adjustable at least in part and independently of each other. In this way, a particular weir may, for example, serve as an overflow weir when the sand is transported into one direction, but as an underflow weir when the sand is transported back, or vice versa. In addition, the sand does not have to be lifted above a weir positioned between the heat exchanger and a storage tank (by fluidization or mechanically), but can, after the weir is lifted, simply flow below it into the next chamber of the heat exchanger or the storage tank. The vertical adjustability of individual or all weirs thus facilitates the transport of the sand, which further reduces the energy required therefor.

Due to the presence of fluidized beds in the chambers of the heat exchanger, no lateral guide rails for the vertically adjustable weirs or seals at their lower ends are necessary, because the weirs can simply be lowered into the fluidized bed. However, it is, of course, possible to provide such rails, seals, or similar components.

Furthermore, the vertical adjustability of the weirs allows control of the height of the sand beds in the individual chambers or the filling heights in the storage tanks, which also allows control of the heat content of the overall heat storage system and in particular the heat exchanger. In addition, the combination of the weir heights and the strength of the fluidizing stream introduced into the individual chambers allows control of the dwell time of the sand in the chambers.

In the case of underflow weirs, on the other hand, the pressure acting on the fluidized bed particles immediately forces the sand to pass under the weir into the next chamber of the heat exchanger, which may for example be adjusted if particularly short dwell times are desired, e.g. if energy is to be obtained quickly from the heat storage.

The type of vertical adjustment of the weirs is not particularly limited, but comprises various types of mechanical, hydraulic and pneumatic hoisting devices, e.g. chain or rope hoists, hoisting platforms, etc. Because of financial reasons, chain or rope hoists made of high-temperature resistant steel are preferred.

The at least one blower for fluidizing the sand may preferably simultaneously serve as a means for transferring heat to the sand by blowing in hot air as a fluidizing medium that at the same time serves as a heat source. In this way, while heating the sand, which is subsequently conveyed into the storage tank for hot sand, part of the heat introduced with the hot air may already be transferred in the fluidized bed heat exchanger to the heat transporting medium and be recovered immediately. The hot air used may, for example, be heated air as it is used according to the state of the art in solar power towers (e.g. DE 101 49 806 C2). But also, for example, hot waste gas from an industrial process may be used as a heat source for this purpose, which might already have a certain overpressure.

Alternatively or in addition, one or more ducts for conveying a hot fluid serving as immediate heat source for the sand through the heat exchanger may be preferably used as a means for transferring heat to the sand, wherein even more preferably bundles of such ducts are used in order to provide the largest possible surface for heat transfer. For example, a gaseous or liquid medium that is used for parabolic-trough solar power plants may be led through these ducts, as for example described in the US applications 2008/01279667 A1 and 2010/0058703 A1 mentioned above.

Similarly, the means for transferring heat from sand to a heat transport medium are preferably one or more ducts for conveying a "cold fluid" serving as a heat transport medium through the heat exchanger, again, even more preferably a bundle of such ducts.

Neither the hot nor the cold fluids are particularly limited, but any flowable liquid or gaseous medium as well as a mixture thereof that is able to absorb and release heat may be used. For example, water or another liquid that evaporates when absorbing heat may be used directly and travel through the ducts as a vapor. In particular when (initially) using it as a cold fluid, the liquid heated and evaporated by contact with the hot sand may subsequently be directly used for propelling steam turbines.

Even though, of course, both the hot and the cold fluids constitute heat transport media, for reasons of simplicity, the hot fluid is herein designated as "heat source" for the sand, while the cold fluid is designated as "heat transport medium" withdrawing heat from the heat storage system as needed, which is then converted into usable energy, e.g. electric power. In fact, the actual heat source is, for example, a power plant, an industrial plant, etc., in which a fluid is heated and then constitutes the "hot fluid" serving as an immediate heat source for the sand. Together, the two fluids are designated as "heat transfer media" in the following.

Preferably, means for withdrawing sand are provided in the two sand storage tanks in order to enable the transport of sand from the lower areas of the storage tanks into the fluidized bed heat exchanger. These means for withdrawing sand are preferably selected from screw, band and bucket conveying and/or hoisting devices as well as fluidizing blowers. Even more preferred are mechanical conveying or hoisting devices in order to keep the energy consumption of the system low. For different applications, however, other conveying and/or hoisting means may be used instead of or in addition to these. The selection of the respective means depends on the application purpose and the design of the inventive heat storage system. In general, a conventional mechanical conveying or hoisting means will be preferred. In order to maximize the efficiency of the inventive heat storage system, a conveying or hoisting means having minimum energy requirements will be preferred.

In a preferred embodiment, the inventive heat storage system includes a system for recovering heat from the fluidizing medium as an additional component, which further increases the energy yield of the system. This system may, for example, comprise recuperative gas heat exchangers above the fluidized bed heat exchanger. Also, fluidizing media from several chambers with similar temperature levels may be bundled and introduced into a common recuperative gas heat exchanger in order to allow an economical design and to recover heat from the fluidizing medium at the highest possible exergetic level.

According to a further preferred embodiment of the invention, heat loss through the fluidizing medium is minimized by providing means for collecting and recycling fluidizing medium above the fluidized bed heat exchanger. Thus, a hot fluidizing medium may—optionally together with a fresh, newly introduced medium—be repeatedly introduced into the fluidized bed heat exchanger in order to transfer as much of the heat amount contained therein as possible to the sand. Recirculation may, for example, be achieved by means of one or more fluidizing blowers running in a hot mode.

In a further, particularly preferred embodiment, means for redirecting the sand in a horizontal direction are provided in one or more chambers of the heat exchanger of the invention. They control the movement of the sand fluidized bed through the respective chamber and may, for example, urge the sand preferably to one side of the chamber and/or cause the sand to move through the chamber in serpentines or meanders. This allows, on the one hand, control of the dwell time of the sand in the chamber, and on the other hand the adjustment of the direction of its movement through the respective chamber to the course of the ducts for heat transfer. For the latter purpose, the redirection means are preferably selected and arranged to achieve a countercurrent between the sand and the medium carried in the ducts within the chamber, which further improves the heat exchange. In addition or alternatively, the course of the ducts may be selected to optimally adapt it to the direction of movement of the sand through the chamber(s) in order to achieve the countercurrent between the sand and the medium carried in the ducts.

The redirection means are not particularly limited and may, for example, be one or more horizontally acting blowers and/or installations within the chambers that project into the respective chamber from the side. For optimizing the efficiency of the heat storage system of the invention, the redirection means are preferably one or more installations that act as a sort of "baffles" in the path travelled by the sand within the chamber. The number, types and positions of the redirection means are not particularly limited.

Herein, "sand" in its broadest sense means any solid, temperature-resistant, abrasion-resistant, non-reactive, granular material that, with a given grain size distribution, has a grain size of approximately 0.03 to 2 mm. This definition thus not only comprises clastic mineral sediments, such as silica sand and industrial sand, but also, for example, granular slag from (iron) metallurgy or from thermal power plant processes, olivine and the like. The grain size and distribution mainly determine the fluidization characteristics of the sand as well as the heat transfer characteristics, so that the selection of an appropriate sand is essential. Of course, due to the geographic location of modern solar power plants, natural sea sand or dune sand might, after appropriate cleaning and sifting, be in some cases preferred for this special field of application.

The materials that the components of the inventive heat storage system, in particular of the storage tanks, the walls of the heat exchanger and the weirs, as well as the optional installations in the chambers are made of are not particularly limited as long as temperature resistance, chemical inertia, abrasion resistance and corrosion resistance are guaranteed. Depending on the component, concrete or high-temperature resistant stainless and special steels are preferred. For vertically adjustable weirs, for example, optionally reinforced, lightweight concrete is the material of choice.

Fluidization of the sand in the fluidized bed heat exchanger may basically be achieved with any fluidizing medium that is not decomposed at the temperatures present and is chemically inert. According to the present invention, preferably a gas or gas mixture, even more preferably flue gas or exhaust gas, is used.

DETAILED DESCRIPTION OF THE INVENTION

The figures schematically show preferred embodiments of the heat storage system of the present invention with vertically adjustable weirs. Of course, these embodiments are not intended as limitation but only serve for an illustration of the invention.

Figure 1:
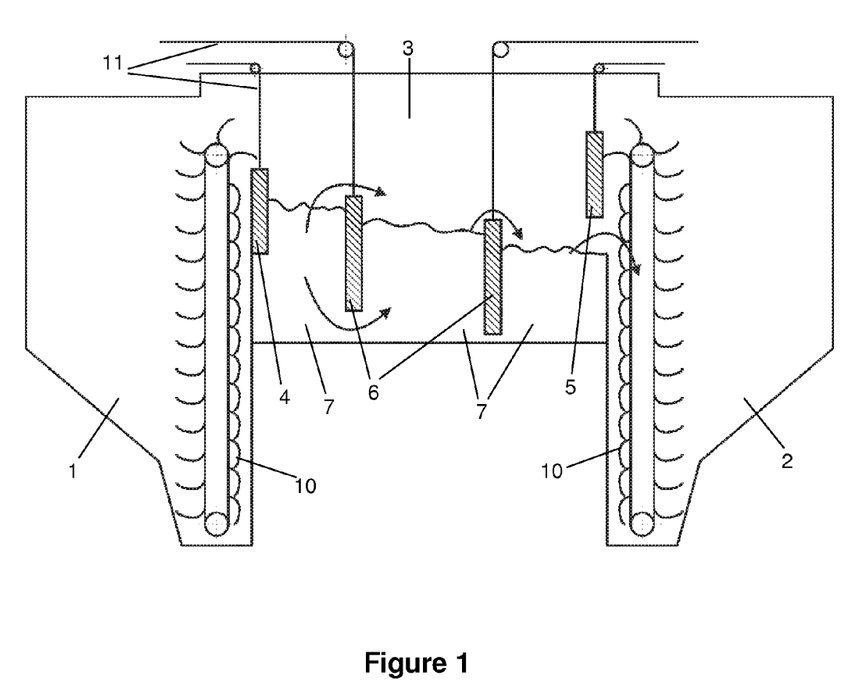
FIG. 1 shows a schematic side view of a preferred embodiment of the heat storage system of the invention.

In FIG. 1, reference 1 indicates a storage tank for cold sand, 2 indicates a storage tank for hot sand, 3 indicates the fluidized bed heat exchanger, which is divided into three chambers 7. The division is achieved by means of two weirs 6, and the delimitation towards the storage tanks 1 and 2 is provided by two weirs 4 and 5. All weirs are vertically adjustable by means of chain or rope hoists 11, and each storage tank comprises a bucket or pan hoister 10 for delivering the sand stored therein. The fluidized bed heat exchanger 3 is fluidized by means of a blower (not shown), which blows a fluidizing medium into the heat exchanger 3 from below in order to create fluidized beds in the chambers 7, the average height of which is marked by wavy lines.

When operating the heat storage system in the "charging" operating mode, i.e. for charging the sand with heat, in which case the cold sand storage 1 is comparatively full and the hot sand storage 2 is comparatively empty, cold sand is transported from the cold sand storage 1 by means of a conveying and/or hoisting means 10, in FIG. 1 shown as a bucket or pan hoister, into the fluidized bed heat exchanger 3. Subsequently, a gradient is created by selecting different heights of the weirs towards the storage tank 2 for hot sand. For this purpose, the weir 5 separating the storage tank 2 from the heat exchanger 3 is pulled up all the way so that the sand can move from the third (in the figure right) chamber 7 of the heat exchanger 3 beneath the weir 5 into the storage tank 2. Both weirs 6 dividing the three chambers 7 of the heat exchanger 3 are shown in a medium or low position, and the movement of the sand is indicated by arrows.

The left one of the two weirs 6 is shown in an intermediate position from where it can be brought into the position of an overflow or an underflow weir. If a short dwell time of the sand in the first (i.e. left) chamber 7 is desired, the weir is left it that position or even lifted up a bit so that the sand can move underneath the weir into the next (i.e. middle) chamber and—assuming that both chambers are approximately equally fluidized—equalize the filling level. If the sand is to remain in the left chamber for a longer time in order to be charged with heat, the left weir 6 is lowered down to the bottom of the heat exchanger 3 so that the sand can only leave the left chamber when the fluidizing stream is increased and the fluidized bed turns into a fast fluidized bed that moves out solids. The right weir 6 functions in a similar way.

Charging the sand with heat may, as mentioned above, for example be achieved by using a hot fluid, e.g. hot air, as a fluidizing medium or by conveying hot fluid through heat exchanger ducts circumflowed by the fluidized sand, or a combination of both.

Figure 2:
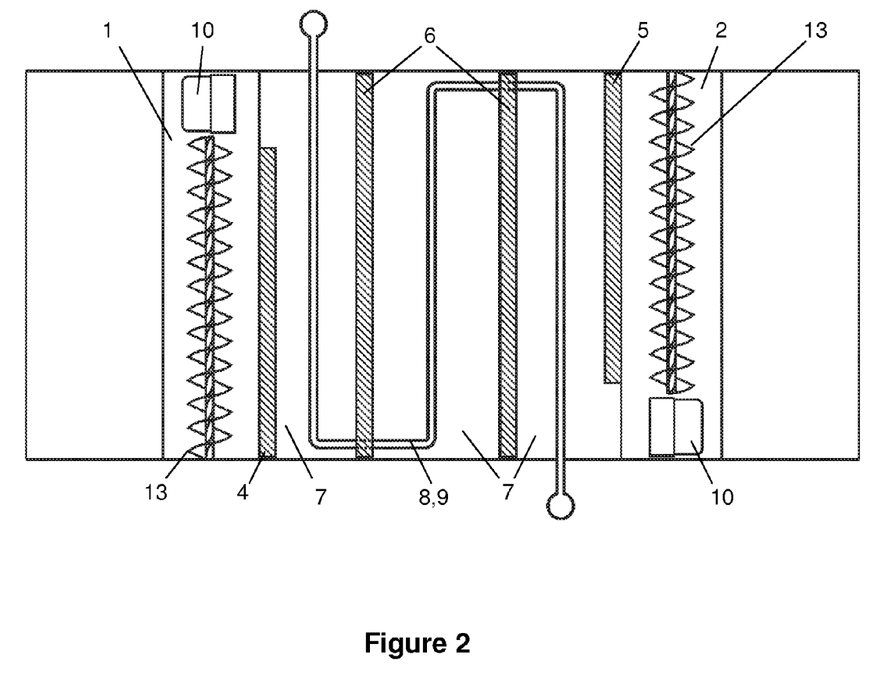
FIG. 2 shows a schematic top view of the embodiment of the heat storage system of the invention shown in FIG. 1.

Such ducts are indicated with the reference "8,9" in FIG. 2. This means that when the sand is charged with heat, the ducts serve as means 8 for transferring heat to the sand fluidized in the respective chamber, and when the sand is "discharged", i.e. during heat release, they serve as means 9 for transferring heat from the sand to a heat transport medium carried in the duct. This is a major advantage of the invention because the charging and release processes can both take place in the same heat exchanger by simply moving different fluids through the ducts 8,9, between which may be switched depending on the operation mode.

FIG. 2 is a schematic top view of the embodiment of FIG. 1 in which the same components are indicated by the same reference numbers. In addition, two screw conveyors 13 are shown in the two sand storage tanks 1 and 2, which serve for transporting the sand horizontally to the respective pan or bucket hoister 10. For this purpose, the bucket hoisters 10 are arranged at the lateral edges of the storage tanks so that the latter can be emptied as completely as possible in the corresponding operation mode. Since the fluidized bed heat exchanger 3 is fluidized, the position of the conveyors 10 in the horizontal direction is basically of minor importance because the filling levels of the respective chambers of the heat exchanger are automatically leveled. However, if a countercurrent movement of the sand with regard to the medium in the ducts 8,9 of the heat exchanger, which is preferred according to the invention, is desired, the conveyors 10 are preferably arranged at the beginning and the end of the sand stream. e.g. at the lateral edges of the first and last chambers 7, as shown in FIG. 2. As is also shown in this drawing, the weirs 4 and 5 do for this purpose not extend over the entire width of the heat exchanger 3.

When providing pneumatic conveyance within the storage tanks 1 and 2, the two conveyors 10 and 13 may be omitted. However, due to the high energy expenditure involved in fluidizing large amounts of sand in the storage tanks, its fluidization is preferred only in in exceptional circumstances.

Figure 3A:
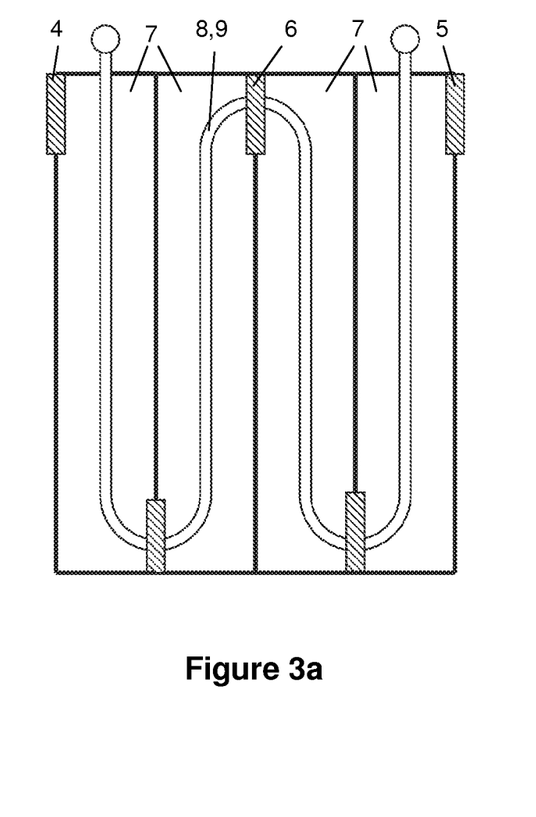
FIGS. 3a to 3c each show a schematic top view of an embodiment of the heat storage system of the invention with installations provided as redirection means.
Figure 3B:
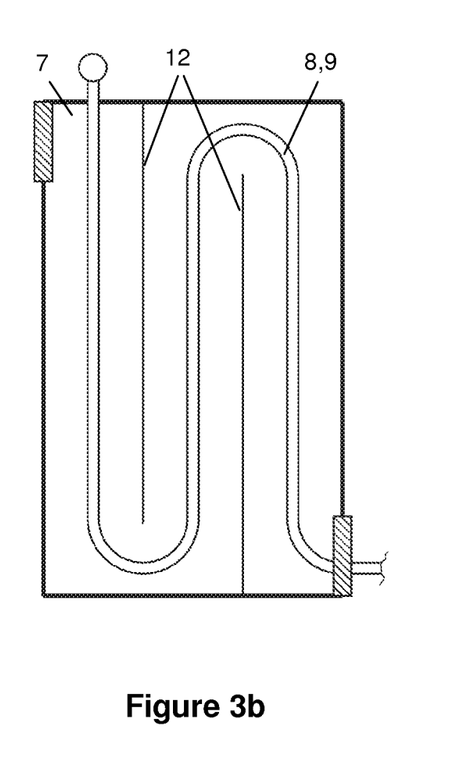
Figure 3C:
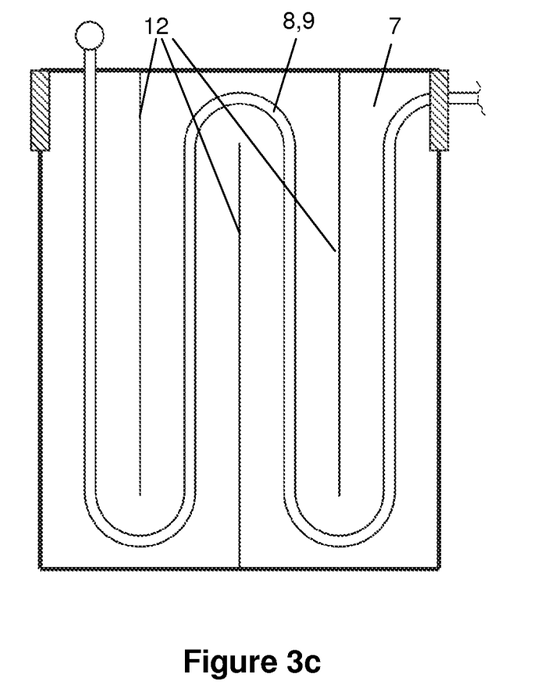

For clarity reasons, the ducts 8,9 are shown as a single duct in FIG. 3—as well as in FIGS. 3a-c, however, it is to be understood that in practice a duct bundle will be used in order to improve heat transfer. In the case shown, the path of the ducts 8,9 from one chamber 7 into the next one runs underneath the weir 6, as is indicated by the dashed line in that area.

Alternatively or in addition, the ducts may also run around the weir 6 outside of the fluidized bed heat exchanger 3. Running the duct above the weir 6 is, however, hardly feasible because of its vertical adjustability.

In the second operation mode, i.e. when "releasing" the heat of the sand, i.e. transferring the heat to a heat transport medium, the configuration of the inventive heat storage system shown in FIG. 1 is inverted, i.e. the weir 5 is positioned at the height shown for weir 4 and vice versa, and the weirs 6 are arranged as overflow or underflow weirs, depending on the desired dwell time. If a fluid conveyed through the duct 8,9 served as a heat source or heat transfer medium when charging the sand with heat (optionally in addition to hot air as a fluidizing medium), release may simply be achieved by reversing the supply of the duct 8 so that the duct now carries a heat transport medium that absorbs heat from the hot sand.

FIGS. 3a and 3b show embodiments of fluidization chambers of the fluidized bed heat exchanger for achieving countercurrent behavior within the chambers 7. In the embodiment of FIG. 3a, five vertically adjustable weirs 4, 5, 6 allow the sand to flow only over the weirs or under the weirs, wherein the weirs are preferably positioned alternatively as overflow and underflow weirs. Thus, the sand is forced to flow countercurrently to the hot or cold fluid within the ducts 8,9 of the duct bundle of the heat exchanger, and this characteristic of a countercurrent heat exchanger leads to very efficient heat transfer.

In FIGS. 3b and 3c the countercurrent of the sand to the hot or cold fluid in the ducts 8,9 within a chamber 7 is achieved by arranging fixed installations 13 as a sort of "baffles" between the ducts. Each baffle 12 projects from one side into the chamber 7, is connected to the bottom of the chamber and is higher than the bed height of the fluidized sand. Thus, they block part, preferably at least three quarters, of the width of the respective chamber 7. The sand can only flow through the open part of the chamber between the chamber wall and the baffle, which creates a countercurrent characteristic within the chamber. The number and shapes of the installations may vary and are not limited to the embodiments shown here with two (FIG. 3b) or three (FIG. 3c) baffles 12.

FIGS. 4a to 4e show different examples of embodiments of a system for recovering heat from the fluidizing medium. The system shown in FIG. 4a recovers the heat from the fluidizing medium by means of a recuperative gas heat exchanger 11, which is—seen in the flow direction of the fluidizing medium—arranged after the fluidizing blower 14 and the fluidized bed heat exchanger, preferably above it. The heat recovered in the gas heat exchanger 11 from the fluidizing medium after passing the heat exchanger is then, at least partially, transferred to the fluidizing medium, after it has passed the fluidizing blower 14 and before it enters into the fluidized bed heat exchanger. The streams of fluidizing medium leaving the four chambers 7 of the fluidized bed heat exchanger are combined to one single stream, which is conveyed through the gas heat exchanger 11. This provides an inexpensive system for recovering heat from the fluidizing medium. Of course, the number of chambers and weirs may vary.

Figure 4A:
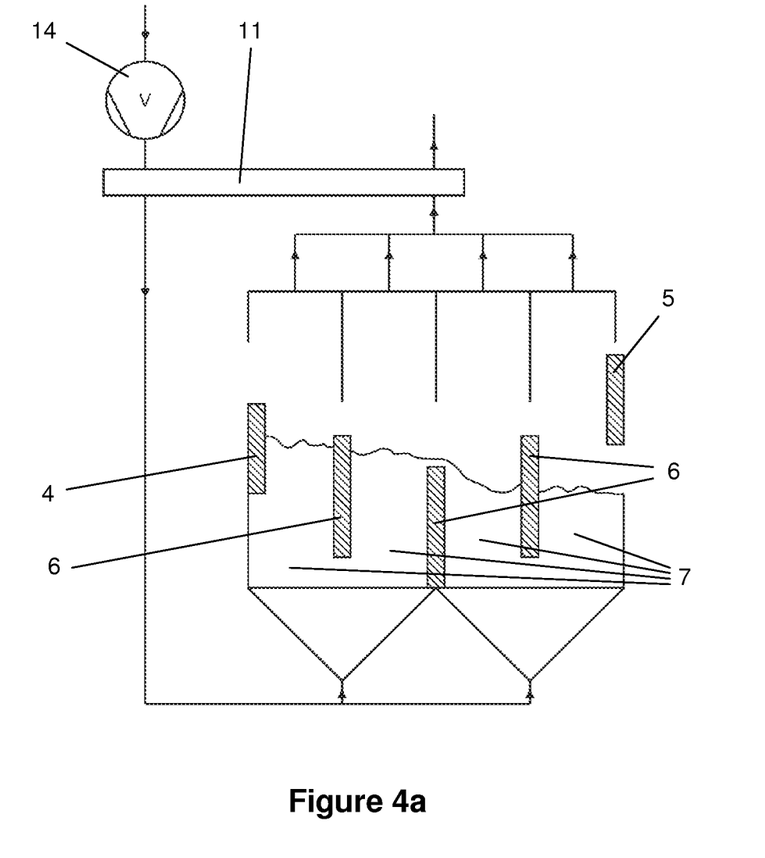
FIGS. 4a to 4e show schematically different embodiments of a heat storage system of the invention with a system for recovering heat.
Figure 4B:
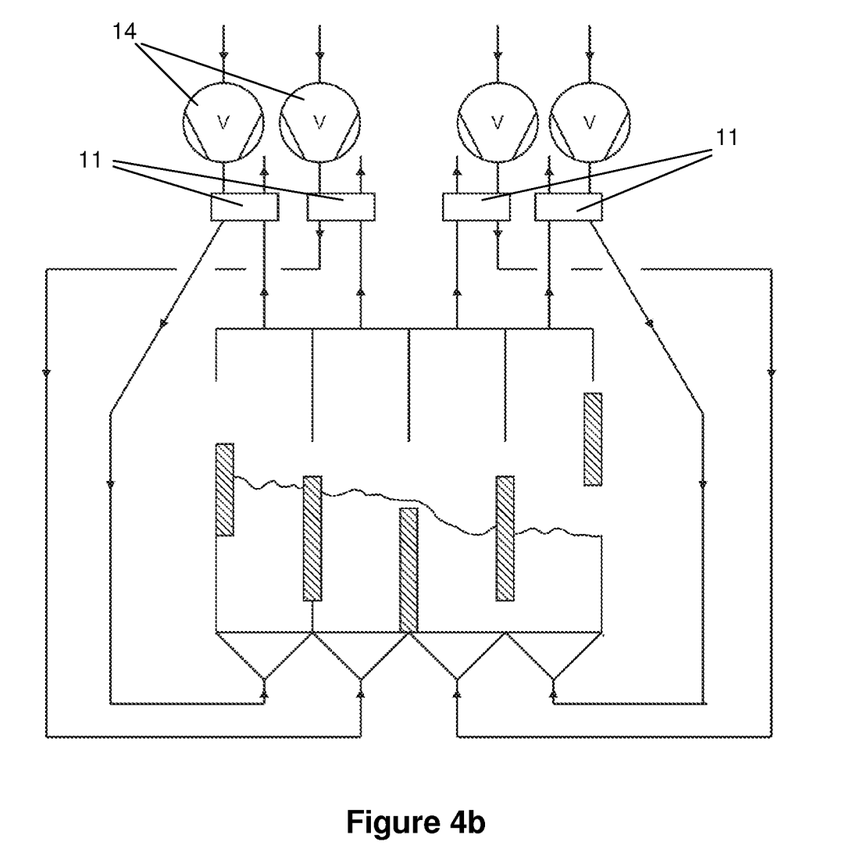

FIG. 4b shows another embodiment of the heat recovery system from the fluidizing medium. Here, the streams from the fluidized bed heat exchanger are not combined, but the heat of each fluidizing medium stream leaving a chamber is recovered separately from all other streams by means of a recuperative gas heat exchanger 11. A combination of the embodiments shown in FIG. 4a and FIG. 4b is also possible, i.e. the streams of fluidizing medium from the chambers may be combined in groups in order to reduce the number of gas heat exchangers 11 required.

Figure 4C:
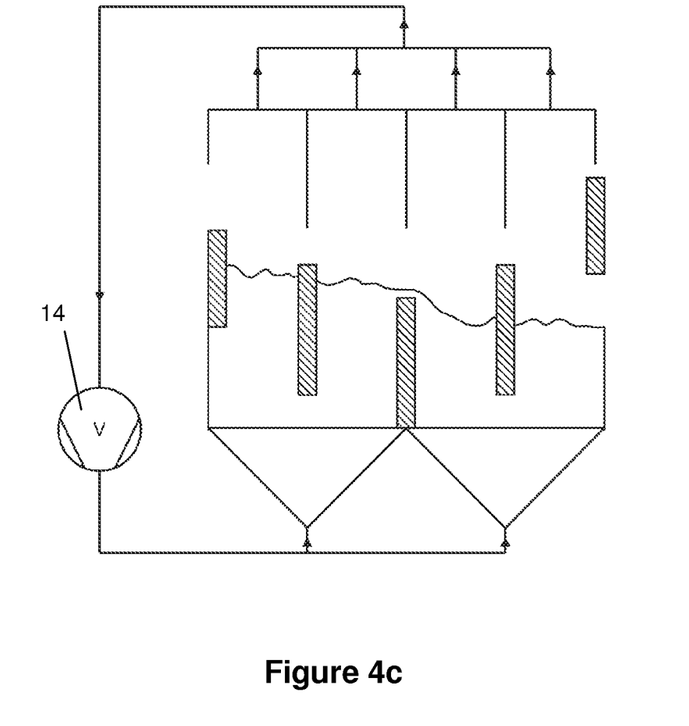

FIG. 4c shows a system for recovering heat from the fluidizing medium by means of recirculating it by using collecting and recirculation means. Here, the streams of fluidizing medium from the chambers of the fluidized bed heat exchanger are combined to one stream, which is then aspired by the fluidizing blower 14 and compacted and then reintroduced into the chambers of the fluidized bed heat exchanger. Thus, the fluidizing blower 14 simultaneously serves as a recirculation means.

Figure 4D:
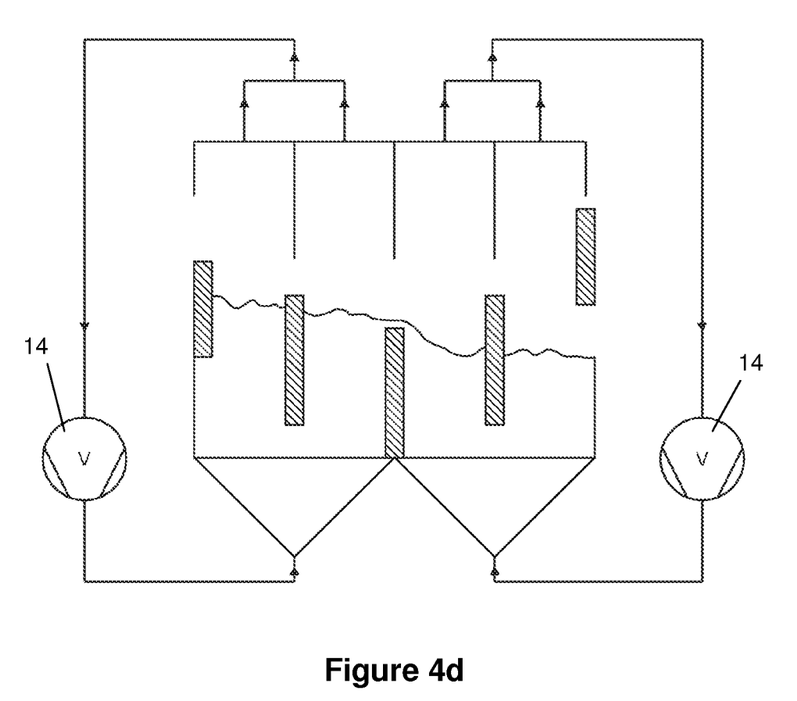

FIG. 4d shows an embodiment where fluidizing medium streams coming from the four chambers of the fluidized bed heat exchanger are combined in pairs by means of two fluidizing blowers 14, compacted and reintroduced into the fluidized bed heat exchanger.

Figure 4E:
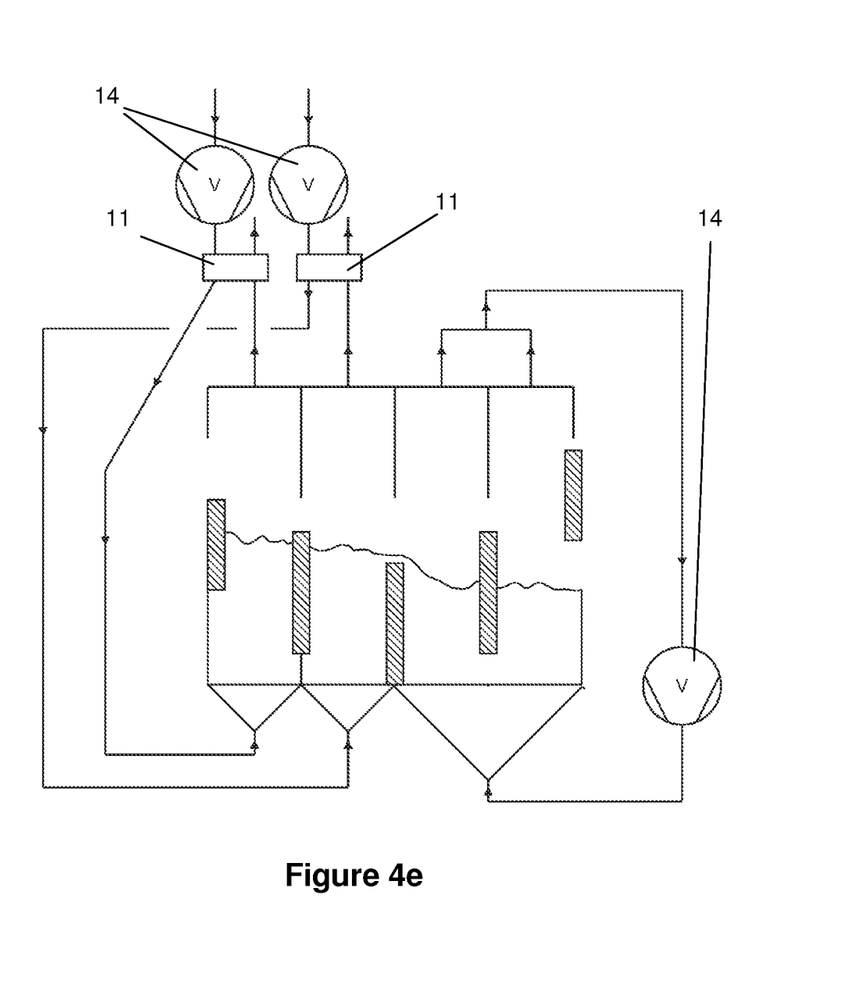

Another system for recovering heat from the fluidizing medium is a combination of several of the above variations that is shown in FIG. 4e. Here, the heat from the fluidizing medium of the two left chambers of the fluidized bed heat exchanger is recovered by means of two recuperative gas heat exchangers 11 and transferred to a fresh fluidizing medium. The heat from the fluidizing medium combined to one stream from the two right chambers is recovered by means of recirculation by use of the right fluidizing blower 14.

In general, however, neither the number of streams combined to one single stream nor the number of recirculating streams of fluidizing medium is limited according to the present invention. This means that any combination of the above and further similar embodiments is also within the scope of the invention as long as the rentability or efficiency of the inventive sand heat storage system can be improved.

Figure 5:
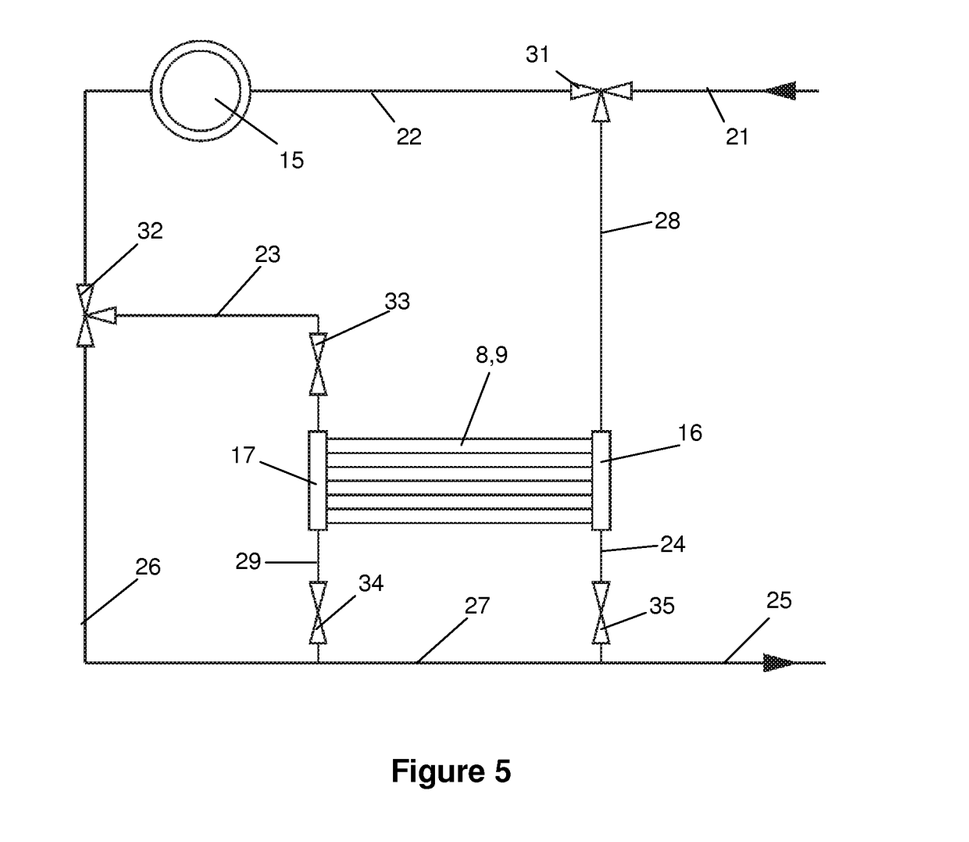
FIG. 5 shows a schematic connection diagram illustrating the possible operation modes of a heat storage system of the invention in combination with a heat-generating plant.

A first example of the use of an inventive heat storage system in combination with a power generation plant is shown in FIG. 5 in the form of a schematic connection diagram. In this figure, the references indicate the following components:
- 15 . . . an outer heat source, such as a power plant, an industrial plant, electricity storage systems or the like;
- 16,17 . . . manifolds or collectors for connecting the respective feeding and discharge ducts with the duct bundle 8,9;
- 21-29 . . . ducts for transporting heat transfer fluid to and from the inventive heat storage system;
- 31-35 . . . flow regulators, such as valves, wherein 31-32 are three-way valves and 33-35 are lock valves.

The duct bundle 8,9 runs through an inventive heat storage system (not shown) to supply heat from the sand fluidized therein to a heat transfer medium or vice versa.

In a first operation mode of the heat storage system of the invention, i.e. when charging the sand with heat, a heat transfer medium serving as a heat source for the sand is conveyed via duct 21, valve 31 and duct 22 to the outer heat source 15, e.g. a solar power plant, where it absorbs heat, i.e. is strongly heated. Via valve 32, duct 23 and valve 33, the now hot fluid travels to the distributor 16, which splits up the duct 23 into a duct bundle 8,9 (in this case 8) that passes through the fluidized bed heat exchanger of the heat storage system and in there releases the heat mainly to the sand contained therein. A lock valve 34 is closed in this case. The collector 17 combines the duct bundle back to duct 24, and the cooled fluid is withdrawn therethrough and via valve 35 and duct 25 from the system (e.g. into a storage tank) or recycled directly via duct 21.

In case no heat is to be stored in the heat storage system or to be taken therefrom, the system of FIG. 3 is switched into a "bypass" mode. In this case, the heat transfer medium travels via duct 21, valve 31 and duct 22 into the outer heat source, where it is heated. Then it is, however, not conveyed through the heat storage system, but leaves the system via ducts 26, 27 and 25, wherein the lock valves 33, 34 and 35 are closed. Outside of the shown system, the heat carried by the fluid is converted into usable energy, e.g. into electrical energy in steam turbines.

In the second operation mode of the inventive heat storage system, i.e. when discharging, the heat transfer medium that serves as a heat transport medium in this case, i.e. a cold fluid, travels via duct 21, valve 31 and duct 28 into the distributor 17, where it is distributed into the duct bundle 8,9 (in this case 9) and thus passes through the fluidized bed heat exchanger where it absorbs heat from the sand. In the collector 16, the duct bundle is recombined to one duct 29, and the now hot fluid leaves the system therethrough and via valve 34 and the ducts 27 and 25, and again the absorbed heat is converted into usable energy. The lock valves 33 and 35 are closed in this case.

A second example is the use of the heat storage system for a continuous use of pulsating, i.e. discontinuously produced, hot exhaust gas from an industrial process, e.g. an industrial furnace.

For this application, the hot exhaust gas is used as a fluidizing medium and heat source when "charging" the storage system with heat. In the "discharge" phase, the solid mass stream is inverted by means of the mechanical conveying and/or hoisting devices and the vertically adjustable weirs, whereafter fluidization occurs with e.g. a cold exhaust gas, a mixture of exhaust gas and fresh air or exclusively with fresh air.

The ducts 8,9 of the fluidized bed heat exchanger carry a heat transport medium both during charging and during discharging, i.e. without inversion of the stream, which heat transport medium can in this case continuously withdraw heat from the heat storage system. When charging the sand with heat, the heat transport medium absorbs the heat mainly directly from the hot exhaust gas, while during discharge, it withdraws the heat from the solid content in the fluidized bed heat exchanger.

The present invention thus provides a heat storage system that is suitable for various purposes and allows a significantly more economical form of heat storage in sand than was possible according to the state of the art.

The invention claimed is:

1. A heat storage system using sand as a solid heat storage medium, wherein the system comprises the following components:
   - a storage tank (1) for cold sand;
   - a storage tank (2) for hot sand;
   - a fluidized bed heat exchanger (3) arranged therebetween, which is separated from the storage tanks (1, 2) by weirs (4, 5) and divided into a plurality of chambers (7) by weirs (6),
   - wherein the weirs (4, 5, 6) are arranged as a combination of overflow and underflow weirs and are vertically adjustable at least in part and independently of each other, in order to allow for sand to be transported in both directions from one storage tank to the other,
   - wherein, in the chambers (7) of the heat exchanger (3), a transferring mechanism (8) configured to transfer heat from a heat source to the sand fluidized therein and a transferring mechanism (9) configured to transfer heat from the sand fluidized therein to a heat transport medium are provided below or above the vertically adjustable weirs (6) separating the chambers (7) from each other,
   - wherein at least one blower (14) is positioned underneath the heat exchanger (3) for fluidizing the sand, and
   - wherein one or more installations (12) project into a respective chamber from a side, are separate and distinct from the heat transfer mechanisms (8, 9), are provided in one or more of the chambers (7) and are configured to redirect the sand in a horizontal direction by urging the sand to one side of the respective chamber and by causing the sand to move through the chamber in serpentines or meanders.

2. The heat storage system according to claim 1, wherein the blower simultaneously serves as the transferring mechanism (8) configured to transfer heat to the sand by blowing in hot air or an exhaust gas as a fluidizing medium and a heat source.

3. The heat storage system according to claim 1, wherein the transferring mechanism (8) configured to transfer heat to the sand is one or more ducts for conveying a hot fluid serving as a heat source through the heat exchanger (3).

4. The heat storage system according to claim 1, wherein the transferring mechanism (9) configured to transfer heat from the sand to a heat transport medium is one or more ducts for conveying a cold fluid serving as a heat transport medium through the heat exchanger (3).

5. The heat storage system according to claim 1, wherein, in the sand storage tanks (1, 2), a transferring mechanism (10, 13) configured to withdraw sand therefrom is provided.

6. The heat storage system according to claim 1, wherein one or more recuperative gas-heat exchangers (11) are provided above the fluidized bed heat exchanger (3) for recovering heat from the fluidizing medium.

7. The heat storage system according to claim 1, wherein one or more fluidizing blowers for collecting and recycling the fluidizing medium are provided downstream of the fluidized bed heat exchanger (3), as seen in the flow direction of the fluidizing medium.

8. A method of using a heat storage system according to claim 1, the method comprising storing heat produced in a power plant.

9. The method according to claim 8, wherein heat produced in the power plant for generating alternative energy is stored.

10. The method according to claim 9, wherein heat produced in a solar power plant is stored.

11. A method of using a heat storage system according to claim 1, the method comprising storing industrial waste heat.

12. A method of using a heat storage system according to claim 1, the method comprising storing waste heat generated during storage of electrical energy.

* * * * *